United States Patent Office 3,054,749
Patented Sept. 18, 1962

3,054,749
PROCESS FOR THE CONTROL OF BACTERIA IN WATER FLOODING OPERATIONS IN SECONDARY OIL RECOVERY
Edward O. Bennett, Houston, Tex., and Edward B. Hodge, Terre Haute, Ind., assignors to Commercial Solvents Corporation, New York, N.Y., a corporation of Maryland
No Drawing. Filed June 10, 1960, Ser. No. 35,150
13 Claims. (Cl. 252—8.55)

Our invention relates to the control of bacteria in water flooding operations used in the secondary recovery of petroleum oils, and more particularly, to controlling such organisms by incorporating into the flooding water amounts of nitroamines having the following structural formula:

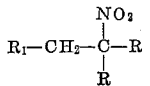

where R is selected from the group consisting of lower alkyl and hydrogen; where $R_1$ is a member selected from the group consisting of —$N(R_2)_2$, morpholino and piperidyl; and where $R_2$ is a member selected from the group consisting of hydrogen, tetrahydrofurfuryl, lower alkyl and lower hydroxyalkyl.

U.S. Patent 2,839,467 lists many of the problems found in the secondary oil recovery art and the means whereby some of these problems have been solved. The problem of controlling sulfate reducing bacteria is ever present and always difficult, as the growth of the microorganisms is not controlled by economically practicable amounts of many bactericides generally utilized in bacterial control and the microorganisms sometimes become resistant to generally used bactericides.

The problems attending the control of other microorganisms are more easily solved but are, nevertheless, present. These microorganisms are generally controlled by moderate amounts of known bactericides.

We have now discovered that noxious microorganisms are economically controlled by our above-described nitroamines. Compounds which we have found to be operative in our process include N-(2-nitroisobutyl)diisopropanolamine, N-(2-nitropropyl)morpholine, N-(2-nitropropyl)dibutylamine, N-(2-nitropropyl)diisobutylamine, N-(2-nitrobutyl)dimethylamine, N-(2-nitrobutyl)-2-ethylhexylamine, N-(2-nitrobutyl)-1-amino-2-propanol, N-(2-nitrobutyl)morpholine, N-(2-nitrobutyl)piperidine, N-(2-nitrobutyl)tetrahydrofurfurylamine, N-(2-nitrobutyl)-morpholine, etc.

The usual procedure for the treatment of water to be utilized in flooding operations is to produce a concentrate of the bactericide in water and then continuously inject this concentrate into the water to be used in flooding operations at a rate which forms a desired dilution of the bactericide. This is done prior to pumping the water into the oil bearing subterranean formation. Sampling and checking the water for bacteria will show whether the chemical concentration needs to be raised or may be lowered to control effectively all bacterial growth and to effect an elimination of sulfate reducing bacteria from the water.

Alternately, the bactericides utilized in our process may be added to the oil-bearing formations periodically, for example, once a week, as a high potency concentrate or the undiluted bactericide may be injected into the formation.

We have found that the compounds utilized in our process are active against some strains of bacteria in water at concentrations as low as about 10–25 p.p.m. However, we prefer to utilize concentrations in excess of about 50–100 p.p.m. as we have found that even very resistant strains of Desulfovibrio desulfuricans effectively controlled at these concentrations.

It is to be understood, of course, that not all of the compounds utilized in our process are effective to the same degree. The following table sets out concentrations at which we have found representative nitroamines coming within the scope of our invention to be completely effective against a resistant strain of Desulfovibrio desulfuricans in water flooding operations.

| Nitroamine: | Effective concentration (p.p.m.) |
|---|---|
| N-(2-nitroisobutyl)diisopropanolamine | 100 |
| N-(2-nitropropyl)morpholine | 12 |
| N-(2-nitropropyl)dibutylamine | 12 |
| N-(2-nitropropyl)diisobutylamine | 50 |
| N-(2-nitrobutyl)dimethylamine | 12 |
| N-(2-nitrobutyl)-2-ethylhexylamine | 25 |
| N-(2-nitrobutyl)-1-amino-2-propanol | 25 |
| N(2-nitrobutyl)morpholine | 50 |
| N-(2-nitrobutyl)piperidine | 100 |
| N-(2-nitrobutyl)tetrahydrofurfurylamine | 100 |
| N-(2-nitrobutyl)morpholine | 50 |

The following examples set out the procedure used in testing our nitroamines for the control of sulfate reducing microorganisms. It is not intended that our invention be limited to the exact compositions or concentrations shown. Rather, it is intended that all equivalents obvious to those skilled in the art be included within the scope of our invention as claimed.

Example I

In a water treatment plant, a water concentrate containing N-(2-nitroisobutyl)diisopropanolamine is continually added to water to be pumped into a subterranean oil-bearing formation to such a rate that a 100 p.p.m. solution of N-(2-nitroisobutyl)diisopropanolamine is formed. The nitroamine treated flooding water is pumped into the oil-bearing formation and is completely effective in preventing bacterial plugging of the oil-bearing sands and the piping system utilized in the water flooding operations.

Example II

Utilizing the process of Example I, we have found that 12 p.p.m. of N-(2-nitropropyl)morpholine is effective in controlling bacteria in water flooding operations.

Example III

Utilizing the process of Example I, we have found that 12 p.p.m. of N-(2-nitropropyl)dibutylamine is effective in controlling bacteria in water flooding operations.

Example IV

Utilizing the process of Example I, we have found that 50 p.p.m. of N-(2-nitropropyl)diisobutylamine is effective in controlling bacteria in water flooding operations.

Example V

Utilizing the process of Example I, we have found that 12 p.p.m. of N-(2-nitrobutyl)dimethylamine is effective in controlling bacteria in water flooding operations.

Example VI

Utilizing the process of Example I, we have found that 25 p.p.m. of N-(2-nitrobutyl)-2-ethylhexylamine is effective in controlling bacteria in water flooding operations.

Example VII

Utilizing the process of Example I, we have found that 25 p.p.m. of N-(2-nitrobutyl)-1-amino-2-propanol is effective in controlling bacteria in water flooding operations.

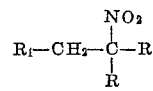

Example VIII

Utilizing the process of Example I, we have found that 50 p.p.m. of N-(2-nitrobutyl)morpholine is effective in controlling bacteria in water flooding operations.

Example IX

Utilizing the process of Example I, we have found that 100 p.p.m. of N-(2-nitrobutyl)piperidine is effective in controlling bacteria in water flooding operations.

Example X

Utilizing the process of Example I, we have found that 100 p.p.m. of N-(2-nitrobutyl)tetrahydrofurfurylamine is effective in controlling bacteria in water flooding operations.

Example XI

Utilizing the process of Example I, we have found that 50 p.p.m. of N-(2-nitrobutyl)morpholine is effective in controlling bacteria in water flooding operations.

This application is a continuation-in-part of our U.S. patent application Serial No. 812,821, filed May 13, 1959, now abandoned.

Now having described our invention what we claim is:

1. In the process of secondary oil recovery characterized by the step of injecting flooding water into oil-bearing subterranean formations to displace portions of the residual oil therein, the improvement comprising having present in said injected flooding water in excess of about 10–25 p.p.m. of a nitroamine having the following structural formula:

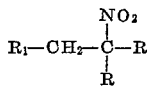

where R is selected from the group consisting of lower alkyl and hydrogen; where $R_1$ is a member selected from the group consisting of $-N(R_2)_2$, morpholino and piperidyl; and where $R_2$ is a member selected from the group consisting of hydrogen, lower alkyl, tetrahydrofurfuryl and lower hydroxyalkyl.

2. In a flooding process for the recovery of oil from oil-bearing subterranean formations, the improvement which comprises flooding the oil-bearing subterranean formation with an aqueous liquid containing in excess of about 50–100 p.p.m. of a nitroamine having the following structural formula:

$$R_1-CH_2-\underset{R}{\overset{NO_2}{C}}-R$$

where R is selected from the group consisting of lower alkyl and hydrogen; where $R_1$ is a member selected from the group consisting of $-N(R_2)_2$, morpholino and piperidyl; and where $R_2$ is a member selected from the group consisting of hydrogen, lower alkyl, tetrahydrofurfuryl and lower hydroxyalkyl.

3. The process of claim 2 wherein the nitroamine is N-(2-nitroisobutyl)diisopropanolamine.
4. The process of claim 2 wherein the nitroamine is N-(2-nitropropyl)morpholine.
5. The process of claim 2 wherein the nitroamine is N-(2-nitropropyl)dibutylamine.
6. The process of claim 2 wherein the nitroamine is N-(2-nitropropyl)diisobutylamine.
7. The process of claim 2 wherein the nitroamine is N-(2-nitrobutyl)dimethylamine.
8. The process of claim 2 wherein the nitroamine is N-(2-nitrobutyl)-2-ethylhexylamine.
9. The process of claim 2 wherein the nitroamine is N-(2-nitrobutyl)-1-amino-2-propanol.
10. The process of claim 2 wherein the nitroamine is N-(2-nitrobutyl)morpholine.
11. The process of claim 2 wherein the nitroamine is N-(2-nitrobutyl)piperidine.
12. The process of claim 2 wherein the nitroamine is N-(2-nitrobutyl)tetrahydrofurfurylamine.
13. The process of claim 2 wherein the nitroamine is N-(2-nitrobutyl)morpholine.

References Cited in the file of this patent

UNITED STATES PATENTS

| | | |
|---|---|---|
| 2,419,506 | Senkus | Apr. 22, 1947 |
| 2,692,231 | Stayner et al. | Oct. 19, 1954 |
| 2,839,467 | Hutchison et al. | June 17, 1958 |
| 2,843,545 | Wolf | July 15, 1958 |
| 2,867,279 | Cocks | Jan. 6, 1959 |
| 2,917,428 | Hitzman | Dec. 15, 1959 |

FOREIGN PATENTS

| | | |
|---|---|---|
| 107,419 | Australia | May 25, 1939 |
| 421,189 | Italy | Mar. 19, 1947 |